L. J. KILLIAN.
AUTOMOBILE SIGNALING DEVICE.
APPLICATION FILED DEC. 27, 1915.

1,212,363. Patented Jan. 16, 1917.
2 SHEETS—SHEET 1.

Witnesses:

Inventor:
Laurence J. Killian.
By Oscar A. Perrigo
ATTORNEY

L. J. KILLIAN.
AUTOMOBILE SIGNALING DEVICE.
APPLICATION FILED DEC. 27, 1915.

1,212,363.

Patented Jan. 16, 1917.
2 SHEETS—SHEET 2.

Witnesses:
Etta J. Perigo
Geo Hastings

Inventor:
Laurence J. Killian
By Oscar E. Perigo
ATTORNEY.

UNITED STATES PATENT OFFICE.

LAURENCE J. KILLIAN, OF BOSTON, MASSACHUSETTS.

AUTOMOBILE SIGNALING DEVICE.

1,212,363.  Specification of Letters Patent.  Patented Jan. 16, 1917.

Application filed December 27, 1915.  Serial No. 68,931.

*To all whom it may concern:*

Be it known that I, LAURENCE J. KILLIAN, of Boston, in the county of Suffolk and State of Massachusetts, have invented a new and useful Improvement in Automobile Signaling Devices, of which the following is a specification.

My invention relates in general to signaling devices applicable to and used upon automobiles, auto-trucks, motor cars and similar vehicles; and particularly to such class of said devices as are intended to give notice to those in the rear of the intended movements, as turning to the right or the left, of such leading vehicles, or instantly stopping. It is the usual custom of the driver of such vehicles to indicate his intended movements by throwing out his hand to the right or the left, or by depending upon some other person in his vehicle doing so. The driver's attention to guiding the car often prevents him from making this signal, or it may be made very imperfectly, or at night imperfectly seen, and when passengers are depended upon to make such signals they may be wrongly or carelessly made or neglected altogether; whereby much confusion and misunderstanding occurs to the drivers of following cars and not infrequently serious accidents and loss of life are the results.

Figures 1, 2, 3, 4, 10:
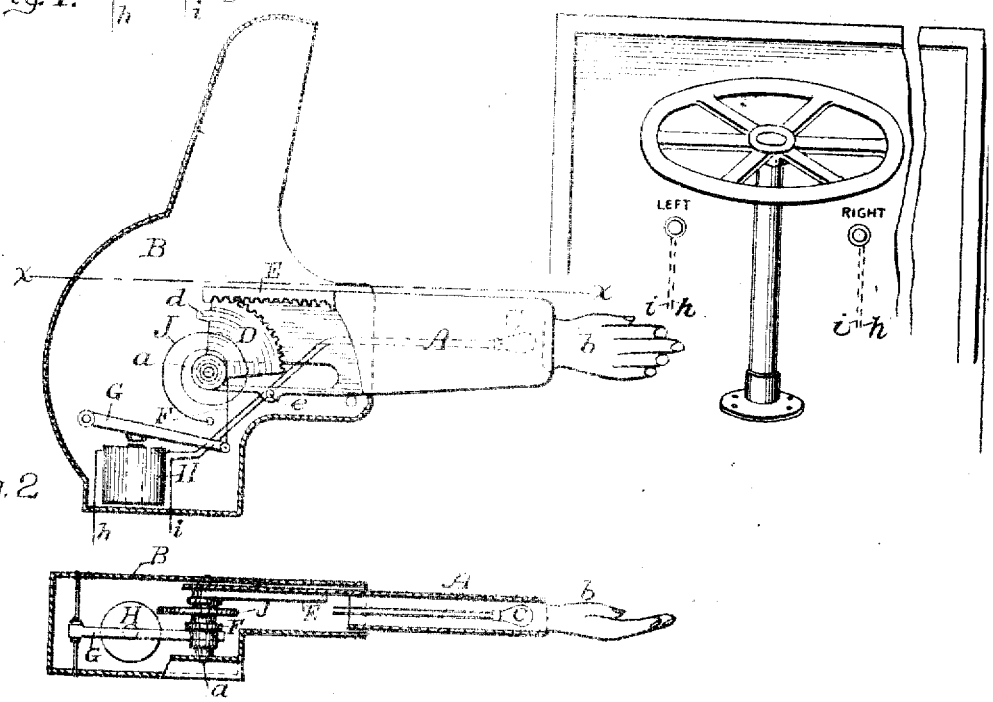
Figure 5:
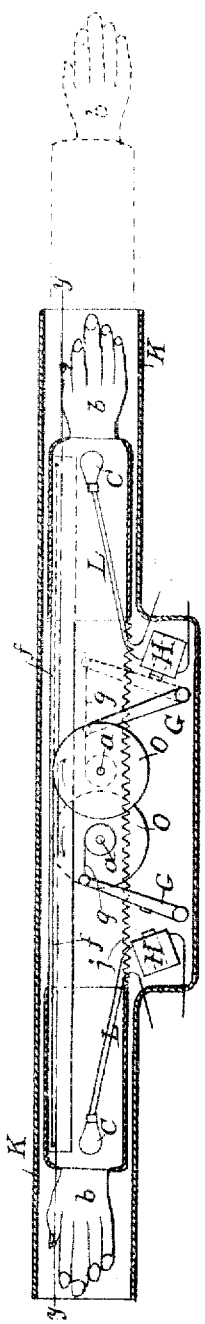
Figure 6:
Figure 8:
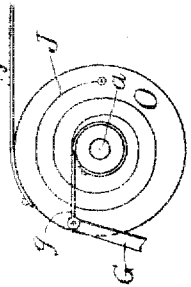
Figure 9:
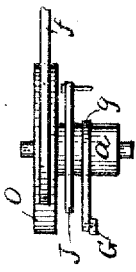
Figure 7:
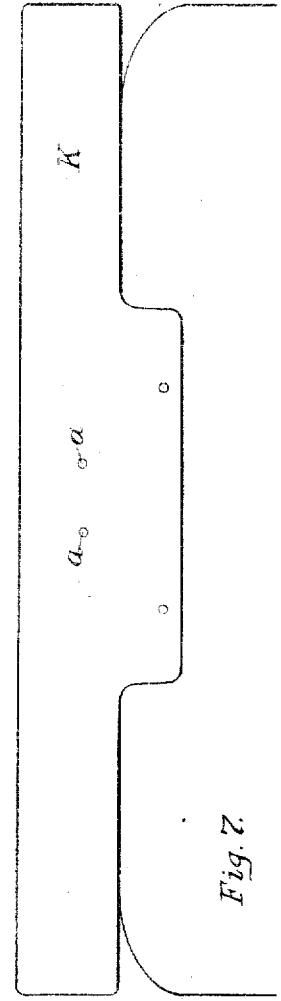

Therefore, my objects are: to render the operating of motor vehicles safe by means of a mechanical signal, positively operated by the touch of an electric button, showing in an unmistakable manner the intended movements of the leading car, by daylight, and to provide that the said signal shall be illuminated by night, whereby it may be as readily seen as when shown in the day time. I accomplish these very desirable objects by means of the devices hereinafter described, and shown in the accompanying drawings in which:

Figure 1 is a vertical section on a longitudinal line, showing the position of the parts when the signal is not in use; Fig. 2 is a similar view showing the signal in use; Fig. 3 is a horizontal section on the line *x x*, Fig. 2; Fig. 4 is a vertical section on the line *z z*, Fig. 1; Fig. 5 is a vertical section on a longitudinal line, of a modificaton of my device; Fig. 6 is a horizontal section on the line *y y*, Fig. 5; Fig. 7 is a front elevation of this modification; Fig. 8 is a front elevation of the operating disk; Fig. 9 is a plan view of the same; Fig. 10 is a front elevation showing the electric connections to the operating push buttons on the dashboard. Similar connecting wires may proceed from controlling push buttons in the foot board, or the steering wheel.

Similar reference letters refer to similar parts in the several views.

My invention consists essentially in providing an imitation of a human hand constructed of translucent or transparent material and illuminated by an electric lamp when the car is operated at night. This is accomplished by means of a small lamp located in the flattened tube representing the forearm. Two methods of operating this signaling hand are here given, the first a downward swing of the hand and forearm, as from the elbow joint, followed by an outward thrust. The second method is to thrust the hand and forearm out horizontally. In the first method two separate devices are necessary, one on the right and one on the left of the car. In the second method the two devices are combined, one arm and hand sliding out to the right and one to the left. These devices may be placed upon the dashboard, upon the back of the driver's seat, or on the rear of the car, as may be most desirable or convenient. Electric current for operating and illuminating the signaling hand may be readily conveyed from whatever source of electric power the car is equipped with by concealed wires.

The construction of my device is as follows: Referring to Fig. 1, the swinging arm A, is slidably pivoted to the shaft *a*, within the flat sheet metal case B, inclosed on all sides except on the right. At the upper end of said arm is fixed the translucent hand *b*, which is illuminated by the electric lamp C. Upon the shaft *a*, is fixed the toothed segment D, which meshes into the toothed rack E, fixed to the arm A. To the shaft *a*, is fixed a thin steel ribbon F, (see Fig. 2,) whose lower end is attached to the lever G, pivoted to the case B, (see Fig. 3,) and forms an armature acted upon by the magnet H. A spiral spring J, has its inner end fixed to the shaft *a*, and its outer end to the case B. At *e*, is a stop pin fixed in the lower extension of the arm A. The magnet H, is operated from whatever source of electric current the car is equipped with and controlled by push buttons hereinafter described, through the wires $h$, $i$, which also furnish current for the lamp C.

The operation of my device is as follows: Electric current having been sent through the wires $h$, $i$, the magnet H, is energized and draws to it the lever G, and at the same time lights the lamp C. Acting through the steel ribbon F, the arm A, is brought down to a horizontal position. Continuing to revolve, the toothed segment D, moves the arm A, horizontally carrying the hand $b$, out to its fullest extent and showing it fully illuminated and easily seen, the effect being heightened by its swinging movement and still further by its outward thrust. The proper warning signal having been given the electric current is cut off and the spiral spring J, acting upon the shaft $a$, first draws the hand A, back to its limit, the projection $d$, strikes the stop pin $e$, and the arm A, is brought back to its original position as shown in Fig. 1.

The modification of my device is shown in Figs. 5, 6, 7, 8 and 9, and its construction is as follows: Within a metal case K, are the sliding bars N, M, to the outer ends of which are fixed the translucent hands $b$, $b$, illuminated by the electric lamps C, C, as shown in Figs. 1, 2, 3 and 4. The arms L, L, are much shorter than the arms A, A, and have no racks E, slot for the shaft $a$, or stop pin $e$. Journaled in the case K, are the shafts $a$, $a$, upon which are fixed the disks O, O, upon the periphery of which are fixed the steel ribbons $f$, $f$, which have their opposite ends fixed to the sliding bars N, M, near their outer ends. Similarly fixed to the shafts $a$, $a$, are the steel ribbons $g$, $g$, whose opposite ends are fixed to the levers G, G, which are pivoted at their opposite ends to the metallic case K. Upon the levers G, G, are the armatures for the magnets H, H, by the action of which these levers are moved. Fixed to the shafts $a$, $a$, are the inside ends of the spiral springs J, J, while their outer ends are fixed to the metallic case K. A helical spring $j$, has each end fixed to one of the arms L, L, by means of which either arm which has been extended beyond the case K, as shown by dotted lines may be returned to its place. The electric connections are the same as those described for the form of my device illustrated in Figs. 1, 2, 3 and 4. The operation of this form of my device is as follows: It being desired to make the signal to the right or left, as the case may be, the proper push button is pressed, the electric current is sent through the magnet adapted to this movement, the lever G, is drawn to the magnet, the shaft $a$, and disk O, rotated by the steel ribbon $g$, and the ribbon $f$, draws forward the sliding bar M, or N, as the case may be, moving out the translucent illuminated hand $b$, to the position shown by dotted lines. The signal having been made the electric current is cut off and the helical spring $j$, draws the extended hand back to its original position.

Having described the construction and operation of my devices and pointed out wherein they are practical and desirable improvements over existing methods and practice, I claim:

1. In a signaling device for motor driven vehicles, the combination of an imitation of a human forearm and translucent hand adapted to swing downward and slide outward, a toothed rack fixed to said forearm, a toothed segment engaging said rack, electric means for rotating said segment and for illuminating said hand, and a retractile spring, constructed and operating substantially as and for the purposes described.

2. In a signaling device for motor driven vehicles, the combination of an imitation of a human forearm and transparent hand adapted to slide horizontally, electric means for illuminating said hand and operating said forearm consisting of a magnet, a lever armature, a shaft, a steel ribbon connecting said lever armature and said shaft, a disk fixed to said shaft and means for connecting said disk and said forearm and hand, all constructed and operating substantially as described and for the purposes set forth.

3. In a signaling device for motor driven vehicles, the combination of an arm pivotally and slidably mounted, a shaft upon which said arm is mounted, a toothed segment fixed to said shaft, a toothed rack fixed to said arm and meshing with said segment, a magnet, a pivoted lever armature connected to said shaft by a steel ribbon, a source of electric current, a spiral spring adapted to restore to their original positions the aforesaid parts after they have been moved by the electric current operating upon said magnet, substantially in the manner and for the purposes described.

LAURENCE J. KILLIAN.

Witnesses:
C. M. CRITCHEY,
JOHN M. BENTING.